United States Patent [19]

Minami

[11] Patent Number: 4,508,388
[45] Date of Patent: Apr. 2, 1985

[54] HOIST CONTROL VALVE INTERLOCK SYSTEM FOR TROLLEY-ASSISTED DUMP TRUCKS

[75] Inventor: Teruo Minami, Kawasaki, Japan

[73] Assignee: Kabushiki Kaisha Komatsu Seisakusho, Tokyo, Japan

[21] Appl. No.: 498,287

[22] Filed: May 26, 1983

[30] Foreign Application Priority Data

May 27, 1982 [JP] Japan .............................. 57-088908

[51] Int. Cl.$^3$ ............................................. B60P 1/16
[52] U.S. Cl. .................................. 298/22 C; 105/239; 105/261 R; 180/2.1; 180/272
[58] Field of Search .................. 298/1 R, 22 R, 22 C; 180/2.1, 65.3, 271, 272; 105/26 D, 29 R, 239, 261 R

[56] References Cited

U.S. PATENT DOCUMENTS 2,600,320 6/1952 Potter ............................ 105/26 D X
3,695,710 10/1972 Cresci et al. ................... 298/22 C X Primary Examiner—Leslie J. Paperner
Attorney, Agent, or Firm—Armstrong, Nikaido, Marmelstein & Kubovcik

[57] ABSTRACT

A hoist control valve interlock system for trolley-assisted dump trucks prevent a dump vessel from an unexpected upward movement caused by the operator's mismanipulation during running on an ascent course under the trolley mode condition. The interlock system has a pair of air cylinders for controlling a hoist control valve operatively connected to hoist cylinders for the dump vessel and directional control air valves for supplying and discharging compressed air from an air reservoir via a trolley mode interlock valve into and from the air cylinders by the operation of a hoist control lever. When the trolley mode interlock valve is shifted to its engine mode position to its trolley mode position, the hoist control valve is interlocked into its floating position by the action of one of the air cylinders where compressed air is supplied from the air reservoir via the trolley mode interlock valve and a shuttle valve irrespective of the air valves.

1 Claim, 1 Drawing Figure

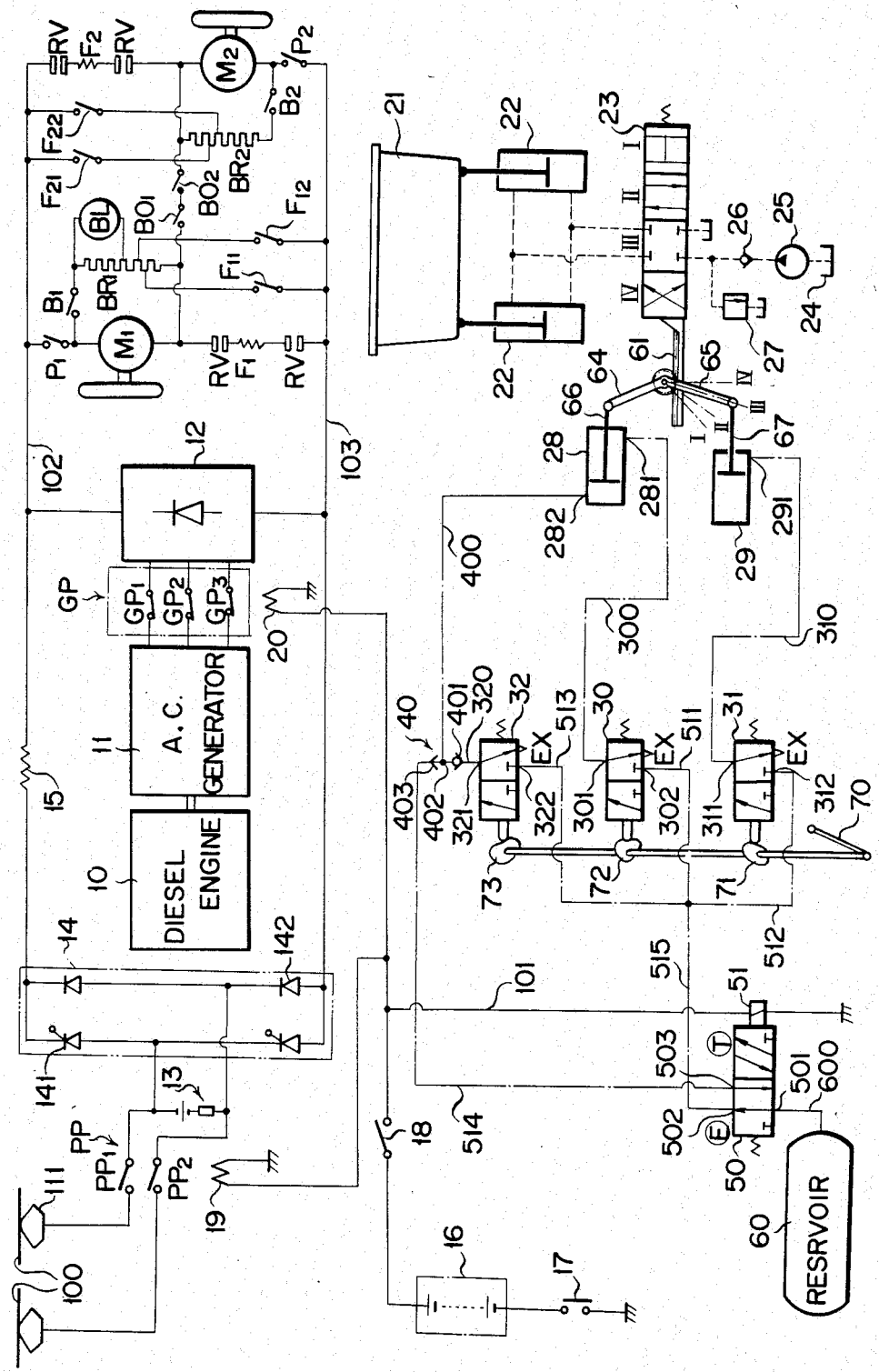

HOIST CONTROL VALVE INTERLOCK SYSTEM FOR TROLLEY-ASSISTED DUMP TRUCKS

BACKGROUND OF THE INVENTION

This invention relates to a hoist control valve interlock system for use in trolley-assisted dump trucks.

In view of the availability of petroleum becoming tight increasingly in the recent years, there is a relevant tendency towards energy saving even in large mines. In particular, in the districts where sufficient power can be generated by hydraulic power and by thermal power obtained by farming coals, but are lacking in petroleum resources, there can be seen a strong demand for replacing petroleum driven mining machines by electrically driven mining machines in order to save petroleum products.

Besides the tendency of petroleum saving, there can be seen a tendency of falling productivity due to the suspension of movements of vehicles so as to prevent a pit of the mine from oxygen deficient condition arising from the exhaust gas smog emitted from the engines of ore carrying vehicles and the amount of which increases as the pit becomes deeper.

In order to eliminate such troubles in the late years, there has been proposed a double-wire trolley assisted dump truck system utilizing a cheap commercial power supply on the ascent courses extending from the bottom of the pits to the dumping areas. If the operator of the trolley-assisted dump truck manipulates by mistake the hoist control lever for controlling the dump vessel during running on an ascent course under the trolley mode condition, then the hoist valve is rendered operative to allow upward movement of the dump vessel, so that the trolley wires through which electric current flows are cut off by the lifted dump vessel thereby causing a big accident.

SUMMARY OF THE INVENTION

The present invention has been contemplated in view of the above-mentioned circumstances, and has for its object to provide a hoist control valve interlock system for use in a trolley-assisted dump truck arranged such that during running on an ascent course under the trolley mode condition, the hoist control valve for the dump vessel is interlocked, and if the operator manipulates by mistake the hoist control lever, the dump vessel is not allowed to move upwards.

To achieve the above-mentioned object, in accordance with the present invention, there is provided a hoist control valve interlock system for use in a trolley-assisted dump truck, characterized in that the system comprises: a pantagraph power contactor which is installed in a main drive circuit of the dump truck and which is rendered ON when the trolley mode switch is turned on so as to drive the truck in a trolley mode condition; a generator power contactor which is installed in the main drive circuit and which is rendered OFF when said trolley mode switch is turned on; a first air cylinder adapted to controllingly actuate a hoist control valve to both a floating position and a lowering position thereof, said hoist control valve being adapted to actuate hoist cylinders for a dump vessel; a second air cylinder adapted to controllingly actuate said hoist control valve to a raising position; an air reservoir for supplying compressed air into said air cylinders; a first air valve connected through a conduit with a lowering port of said first air cylinder to make the supply and discharge of the compressed air from said air reservoir; a second air valve connected through another conduit with a raising port of said second air cylinder to make the supply and discharge of the compressed air from said air reservoir; a shuttle valve which is provided in a conduit connected between the floating port of said first air cylinder and said air reservoir; a third air valve connected through the shuttle valve with the floating port of said first air cylinder; a trolley mode interlock valve which is provided in the conduit connected between said air reservoir and said air valves and between said air reservoir and said shuttle valve, said trolley mode interlock valve being adapted to be switched from an engine mode position over to a trolley mode position when said trolley mode switch is turned on; and a hoist control lever for controlling said first, second and third air valves, the arrangement being made such that when said trolley mode interlock valve is switched over to the trolley mode position, the compressed air from said air reservoir is supplied through said shuttle valve into the floating port of said first air cylinder irrespective of the position of said hoist control lever so that said hoist control valve is interlocked into the floating position thereof.

BRIEF DESCRIPTION OF THE DRAWINGS

The above and many other advantages, features and additional objects of the present invention will become apparent to those spilled in the art upon making reference to the following detailed description and accompanying drawings in which preferred structural embodiments incorporating the principles of the present invention are shown by way of illustrative example.

The accompanying drawing is a view for explaining the arrangement of one embodiment of a hoist control valve interlock system for a trolley-assisted dump truck according to the present invention.

DETAILED DESCRIPTION OF THE INVENTION

The present invention will now be described in detail with reference to the accompanying drawing.

The main drive circuit comprises a diesel engine 10, an alternating current generator 11, contacts $GP_1$, $GP_2$ and $GP_3$, a rectifier 12, armatures $M_1$ and $M_2$ of motors, field coils $F_1$ and $F_2$ of the motors, brake resistors $BR_1$ and $BR_2$, a blower motor BL, accelerator contactors $P_1$ and $P_2$, brake contactors $BO_1$, $BO_2$, $B_1$ and $B_2$, and field weakening contactors $F_{11}$, $F_{12}$, $F_{21}$ and $F_{22}$, a pantagraph 111 serving as a trolley assisting means or current collector, contacts $PP_1$ and $PP_2$, an a.c filter 13, a mixed bridge rectifier 14 comprised of thyristors 141 and diodes 142, a reactor 15 for smoothing a single phase pulsating current, a battery 16 mounted on the vehicle, a battery switch 17 and a trolley mode change-over switch 18. The contactors $P_1$ and $P_2$ for accelerator are adapted to be energized and closed by an accelerator pressure switch not shown, whilst the contactors $BO_1$, $BO_2$, $B_1$ and $B_2$ for brake are adapted to be energized and closed by a brake pressure switch not shown. Further, the arrangement is made such that the two contactor groups i.e. $P_1$, $P_2$ and $BO_1$, $BO_2$, $B_1$ and $B_2$ are electrically or mechanically interlocked so that both groups cannot be rendered operative simultaneously.

The contacts $PP_1$ and $PP_2$ of the pantagraph power contactor 19 and the contacts $GP_1$, $GP_2$ and $GP_3$ of the generator power contactor 20 are both adapted to be rendered on by the trolley mode switch 18, and also arranged to be interlocked electrically or mechanically so that the two groups of contacts cannot be turned on simultaneously.

In the drawing, reference numeral 21 denotes a dump vessel which is connected to hoist cylinders 22, 22 and which is adapted to be actuated by a fluid pressure through the intermediary of a hoist control valve 23 having four positions; that is, a raised position, a locked position, a lowered position and a floating position. Reference numeral 24 indicates an oil reservoir, 25 a hydraulic pump, 26 a non-return valve, and 27 a relief valve.

The hoist control valve 23 has a spool rod 61 with a rack 62 formed thereon. Meshing with the rack 62 is a pinion 63, the central shaft of which has levers 64 and 65 connected thereto. The lever 64 on one side is connected by a pin to a piston rod 66 of an air cylinder 28, whilst the lever 65 on the other side is connected by a pin to a piston rod 67 of an air cylinder 29.

In the drawing, reference numerals 30, 31 and 32 denote first, second and third air valves, respectively. The first air valve 30 has a port 301 connected through a conduit 300 with a lowering port 281 of the air cylinder 28, and the second air valve 31 has a port 311 connected through a conduit 310 with a raising port of the air cylinder 29.

The third air valve 32 has a port 321 connected through a conduit 320 with one port 401 of a shuttle valve 40 which has also an output port 402 connected through a conduit 400 with a floating port 282 of the air cylinder 28.

In the drawing, reference numeral 50 denotes a trolley mode interlock valve, a port 501 of which is connected through a conduit 600 with an air reservoir 60. Further, the trolley mode interlock valve 50 has a port 502 connected through conduits 511, 512 and 513 with ports 302, 312 and 322 of the air valves 30, 31 and 32, respectively, and also a port 503 connected through a conduit 514 with another port 503 of the aforementioned shuttle valve 50.

The output terminal of the aforementioned trolley mode switch 18 is connected through a lead wire 101 with a solenoid 51 of the aforementioned trolley mode interlock valve 50.

In the drawing, reference numeral 70 indicates a hoist control lever adapted to be manipulated by the operator of the dump truck, which is provided with cams 71, 72 and 73 for actuating the aforementioned air valves 30, 31 and 32, respectively. The running mode of the trolley-assisted dump truck is a dual mode including an engine mode and a trolley mode wherein the truck is run by the external power supply. The arrangement is made such that the dump truck may run in the engine mode when running on a loading area, a dumping area and also when running down on a slope under unloaded conditions.

In the engine mode, the three phase alternating current generated by the a.c. generator 11 driven by the diesel engine 10 will flow through the contacts $GP_1$, $GP_2$ and $GP_3$ of the generator power switch GP and the all-wave rectifier 12 where the alternating current is rectified into a direct current which flows through a cable 102 and then through the armatures $M_1$ and $M_2$ of the motors connected to the left and right hand drive wheels and the field coils $F_1$ and $F_2$ thereof thereby driving the wheels. The control of the motors at that time is made when the accelerator contactors $P_1$ and $P_2$ and the brake contactors $BO_1$, $BO_2$, $B_1$ and $B_2$ are turned on or off.

When the vehicle is being propelled, an accelerator switch not shown is turned on and the accelerator contactors $P_1$ and $P_2$ are also turned on, whilst when the vehicle is subjected to a dynamic braking, a brake switch also not shown is turned on and the brake contactors $BO_1$, $BO_2$, $B_1$ and $B_2$ are turned on.

The aforementioned a.c. generator 11 is arranged to be controlled by allowing a control current to flow through a control cabinet not shown. Further, the control electric current varies in proportion to the angles of depression of pedals adapted to actuate the accelerator switch and the brake switch both of which are not shown herein.

Whilst, in the trolley mode to be utilized when the laden vehicle runs on an ascent, the three phase alternating currnt is transformed into a single phase alternaing current which flows through double trolley wires 100, two pantagraphs 111 and then through the contacts $PP_1$, $PP_2$ of the pantapraph power contactor PP into the mixed bridge rectifier 14 where it is rectified. The mixed bridge rectifier 14 comprises in combination two sets of thyristors 141 and two sets of diodes 142. The rectified current is under pulsating condition, and so it is smoothed by the reactor 15 and then flows through the cables 102 and 103. The AC filter 13 serves to prevent the possible surge from the trolley wires 100 from flowing through the cables.

The hoist control lever 70 is maintained at the floating position when the vehicle is running to reduce the power loss in the hydraulic circuit. The trolley mode interlock valve 50 is a solenoid valve having an engine mode position  E  and a trolley mode position  T . When the trolley mode switch 18 is turned on so as to energize the solenoid 51, the trolley mode interlock valve will move to its position  T . Under such a condition, the compressed air from the air reservoir 60 will flow through the conduit 514 and the shuttle valve 40 and then through the conduit 400 into the floating port 282 of the air cylinder 28 thereby forcibly holding the hoist control valve 23 at a floating position irrespective of the position of the hoist control lever 70. In another words, when the vehicle is running in the trolley mode, even if, for example, the operator manipulates by mistake the hoist control lever 70, the compressed air is not allowed to flow into the conduit 515 of the hoist control valve so that interlocking may be taken place. Therefore, such a trouble as unexpected upward movement of the dump vessel which otherwise may occur during the running of the dump truck on an ascent under the trolley mode condition to thereby cut off the trolley wires can be prevented.

Release of the interlock can be made by turning the trolley mode switch 18 off to deenergize the solenoid 51 of the trolley mode interlock valve 50 thereby enabling the valve 50 to be switched over to the engine mode position  E  the resiliency of its spring. At the the  E , ordinary hoist control can be effected. The shuttle valve 40 serves to prevent the occurrence of bypassing.

It is to be understood that the foregoing description is merely illustrative of a preferred embodiment of the invention and that the invention is not to be limited thereto, but is to be determined by the scope of the appended claim.

What is claimed is:

1. A hoist control valve interlock system for use in a trolley-assisted dump truck, characterized in that said system comprises:
   - (a) a pantagraph power contactor which is installed in a main drive circuit of the dump truck and which is rendered ON when the trolley mode switch is turned on so as to drive the truck in a trolley mode condition;
   - (b) a generator power contactor which is installed in the main drive circuit and which is rendered OFF when said trolley mode switch is turned on;
   - (c) a first air cylinder adapted to controllingly actuate a hoist control valve to both a floating position and a lowering position thereof, said hoist control valve being adapted to actuate hoist cylinders for a dump vessel;
   - (d) a second air cylinder adapted to controllingly actuate said hoist control valve to a raising position;
   - (e) an air reservoir for supplying compressed air into said air cylinders;
   - (f) a first air valve connected through a conduit with a lowering port of said first air cylinder to make the supply and discharge of the compressed air from said air reservoir;
   - (g) a second air valve connected through another conduit with a raising port of said second air cylinder to make the supply and discharge of the compressed air from said air reservoir;
   - (h) a shuttle valve which is provided in a conduit connected between the floating port of said first air cylinder and said air reservoir;
   - (i) a third air valve connected through the shuttle valve with the floating port of said first air cylinder;
   - (j) a trolley mode interlock valve which is provided in the conduit connected between said air reservoir and said valves and between said air reservoir and said shuttle valve, said trolley mode interlock valve being adapted to be switched from an engine mode position over to a trolley mode position; and
   - (k) a hoist control lever for controlling said first, second and third air valves; the arrangement being made such that when said trolley mode interlock valve is switched over to the trolley mode position, the compressed air from said air reservoir is supplied through said shuttle valve into the floating port of said first air cylinder irrespective of the position of said hoist control lever so that said hoist control valve is interlocked into the floating position thereof.

* * * * *